US007661033B2

(12) United States Patent
Challener et al.

(10) Patent No.: US 7,661,033 B2
(45) Date of Patent: *Feb. 9, 2010

(54) METHOD AND SYSTEM FOR ESTABLISHING NETWORK CONNECTIONS

(75) Inventors: David C. Challener, Raleigh, NC (US); Steven J. Mastrianni, Unionville, CT (US); Joseph R. Parker, Hillsborough, NC (US); Ratan Ray, Durham, NC (US); Leendert P. Van Doorn, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/200,781

(22) Filed: Aug. 28, 2008

(65) Prior Publication Data
US 2008/0320135 A1 Dec. 25, 2008

Related U.S. Application Data

(63) Continuation of application No. 10/733,055, filed on Dec. 11, 2003, now abandoned.

(51) Int. Cl.
*G06F 11/00* (2006.01)
(52) U.S. Cl. .................. 714/39; 714/4; 714/26; 714/43; 709/223; 709/224; 709/225; 709/227; 370/216; 370/225; 370/227
(58) Field of Classification Search .......... 714/4, 714/26, 39, 43; 709/223–225, 227; 370/216, 370/225, 227
See application file for complete search history.

(56) References Cited

U.S. PATENT DOCUMENTS

| 4,999,833 | A | 3/1991 | Lee |
| 5,497,460 | A | 3/1996 | Bailey |
| 5,809,282 | A | 9/1998 | Cooper et al. |
| 6,374,295 | B2* | 4/2002 | Farrow et al. ............... 709/223 |
| 6,502,130 | B1 | 12/2002 | Keeler, Jr. et al. |
| 6,742,141 | B1* | 5/2004 | Miller ....................... 714/26 |

(Continued)

OTHER PUBLICATIONS

Chen, K., et al., "Workflow Mechanism For A Stateless Environment" pp. 1-8.

(Continued)

*Primary Examiner*—Robert Beausoliel
*Assistant Examiner*—Charles Ehne
(74) *Attorney, Agent, or Firm*—John R. Biggers; Jason O. Piche; Biggers & Ohanian, LLP.

(57) ABSTRACT

A method, computer readable medium and computer system for repairing a failed network connection between a client system and a network is disclosed. In a first aspect, the method preferably includes collecting real time connectivity information by the client system and utilizing the real time connectivity information by the client system to establish a connection with the network. In a second aspect, a computer system coupled to a network includes at least one network adapter for monitoring and collecting real time connectivity information from the network, memory for storing the real time connectivity information, and a processor coupled to the memory and to the at least one network adapter, where the processor is configured to execute program instructions for utilizing the real time connectivity information to repair a failed network connection between the computer system and the network.

25 Claims, 3 Drawing Sheets

U.S. PATENT DOCUMENTS

| | | | | |
|---|---|---|---|---|
| 7,096,210 | B1* | 8/2006 | Kramer et al. | 706/45 |
| 2001/0056503 | A1* | 12/2001 | Hibbard | 709/250 |
| 2002/0032780 | A1 | 3/2002 | Moore et al. | |
| 2002/0178246 | A1 | 11/2002 | Mayer | |
| 2003/0142633 | A1* | 7/2003 | Wall et al. | 370/254 |
| 2006/0092926 | A1* | 5/2006 | Tang et al. | 370/352 |

OTHER PUBLICATIONS

Garrett, H.M., et al. "System And Method For Determining network Configuration", 1 pg.

Fogel, D. Blakely, et al., "System And Method For Network Configuration", 1 pg.

Hutson, W.E., et. al, "Visual Warbling To Subtly Indicate Status Conditions", 1 pg.

* cited by examiner

METHOD AND SYSTEM FOR ESTABLISHING NETWORK CONNECTIONS

CROSS-REFERENCE TO RELATED APPLICATIONS

Under 35 U.S.C. §120, this application is a continuation patent application and claims the benefit of priority to U.S. patent application Ser. No. 10/733,055, filed Dec. 11, 2003, entitled "Computer Product And System For Establishing Network Connections", all of which is incorporated herein by reference.

FIELD OF THE INVENTION

The present invention relates to computer network systems and in particular to a method and system for establishing a network connection between a client system and the network.

BACKGROUND OF THE INVENTION

Despite advances in hardware and software technology, computer users frequently encounter situations in which they cannot establish a connection to a service provider or network. What is meant by establishing a connection in the context of the present application is either creating a first connection to a network or repairing a connection to a network. Repairing a connection to a network can be the result of an improperly installed or configured software program or device driver, or the device being used to attempt the connection may simply be disabled. In the case of a wired connection, the problem may be caused by a defective interconnect cable, or in the case of a wireless connection, a bad transmitter or antenna connection. In addition to such defects, other problems in the network can prevent the user from getting connected. For example, in the case of an Ethernet network, the failure of the network's Dynamic Host Configuration Protocol, or DHCP server, can prevent the user from getting connected to the network.

Because the majority of these problems are not communicated to the user, the user cannot determine the cause, and sees the problem as simply "no connection." Moreover, even if the user was able to determine the source of the problem, e.g., through an error message generated by the system, he or she would most likely not know how to resolve the problem.

Accordingly, what is needed is a system and method for determining the cause of a connectivity problem and repairing the connection. The system and method should be automatic and transparent to the user. The present invention addresses such a need.

SUMMARY OF THE INVENTION

A method, computer readable medium and computer system for establishing a network connection between a client system and a network is disclosed. In a first aspect, the method preferably includes collecting real time connectivity information by the client system and utilizing the real time connectivity information by the client system to establish a connection with the network. In a second aspect, a computer system coupled to a network includes at least one network adapter for monitoring and collecting real time connectivity information from the network, memory for storing the real time connectivity information, and a processor coupled to the memory and to the at least one network adapter, where the processor is configured to execute program instructions for utilizing the real time connectivity information to repair a failed network connection between the computer system and the network.

DETAILED DESCRIPTION

The present invention relates to computer network systems, and in particular to a method and system for establishing a network connection between a client system and the network. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The preferred embodiment of the present invention determines the cause of a connectivity problem and attempts to repair the connection by applying changes to the operating software and/or device configuration in an iterative fashion until a connection is established. It determines the types of changes or repairs to make by collecting information related to the network and to the status of system components, and based in part on that information, begins an iterative process of attempting to establish the connection. The system and method according to a preferred embodiment of the present invention includes an inference engine that determines the cause of the connection failure and the appropriate corrective action based on information contained in several sources, including but not limited to, a local persistent knowledgebase, a real time network list, a set of local rules, and a server-resident database. In a preferred embodiment, the system and method of the present invention evaluates the conditions of a particular connection, and by consulting one or more of the above listed sources, determines a hierarchy of potential solutions and applies each potential solution iteratively until a connection is established. The result of each iterative attempt is monitored, and if unsuccessful, the result, e.g., an error message, is used as feedback to the inference engine.

Figure 1:
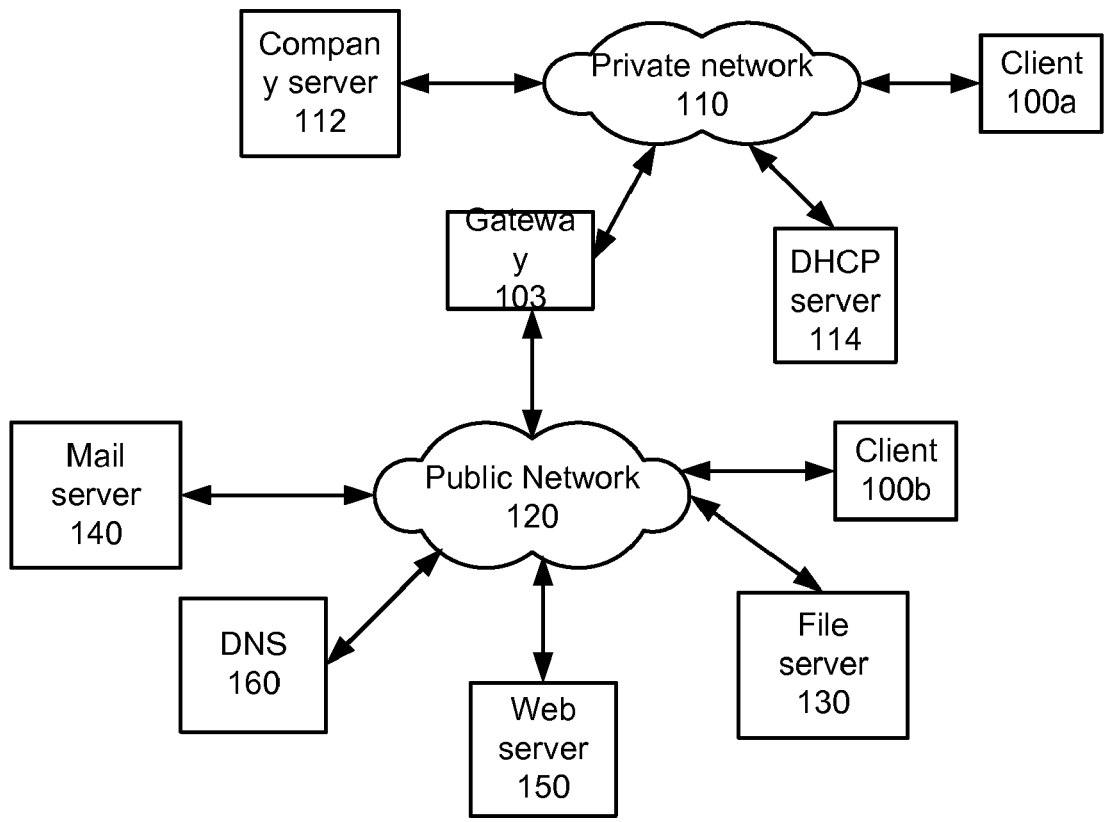
FIG. 1 illustrates a block diagram of a system configuration for a preferred embodiment of the present invention.

FIG. 1 illustrates a block diagram of a system configuration for a preferred embodiment of the present invention. Preferably the present invention is implemented on client computer systems 100*a* and/or 100*b*. As is shown, a first client computer system 100*a* is coupled to a public network 120, such as the Internet. A second client computer system 100*b* is coupled to a private network 110 such as a Local Area Network (LAN). The private network 110 is coupled to the public network 120 via a gateway 103. Nonetheless, those skilled in the art appreciate that a client system 100 (i.e., either client computer system 100*a* or client computer system 100*b*) can be coupled to either a private or public network, and not necessarily to both. The client computer system 100 can be mobile, e.g., a laptop or handheld personal computer, or a stationary desktop. A user uses the client computer system 100 to perform information management tasks, including sending and receiving electronic mail from a mail server 140 or from a company server 112, retrieving web pages from a web server 150, and sending and receiving data files from a file server 130 or the company server 112. The client 100 includes an operating system and appropriate hardware adapters such as a dial-up modem or wireless card, or a network adapter such as Token Ring or Ethernet that allows connection to a network 110, 120 through a cable modem, DSL modem, hub, or switch.

Figure 2:
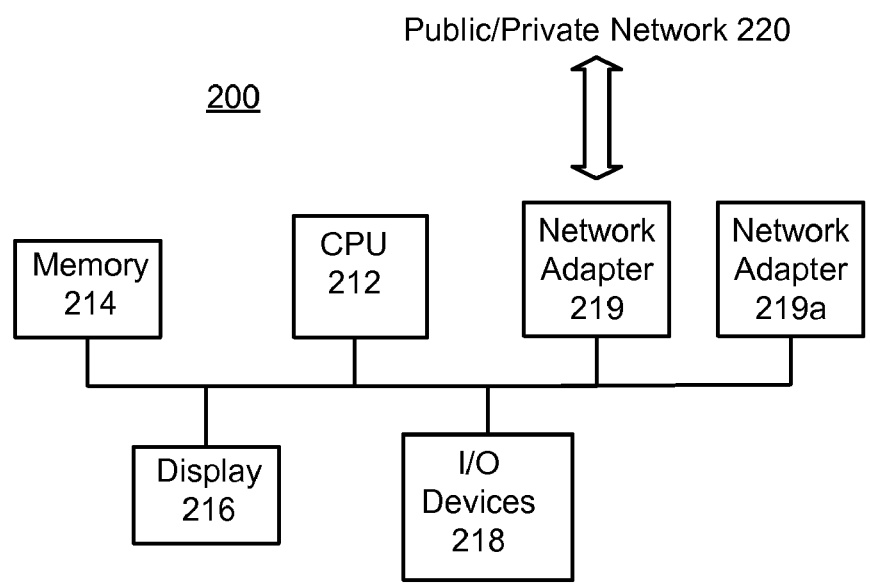
FIG. 2 is a block diagram of a client system according to a preferred embodiment of the present invention.

FIG. 2 is a block diagram of the client computer system 200 according to a preferred embodiment of the present invention. The client 200 includes a processor or central processing unit (CPU) 212 that is coupled to memory 214 (e.g., system, RAM, ROM), a display device 216, input/output devices 218, and two network adapters 219 and 219a for connecting the client 200 to the network 220, e.g., via a wired or wireless connection, respectively. In the preferred embodiment, the network adapters, e.g., 219 and 219a, are capable of monitoring and capturing network traffic in real time using a wired or wireless method, as is well known in the art.

Figure 3:
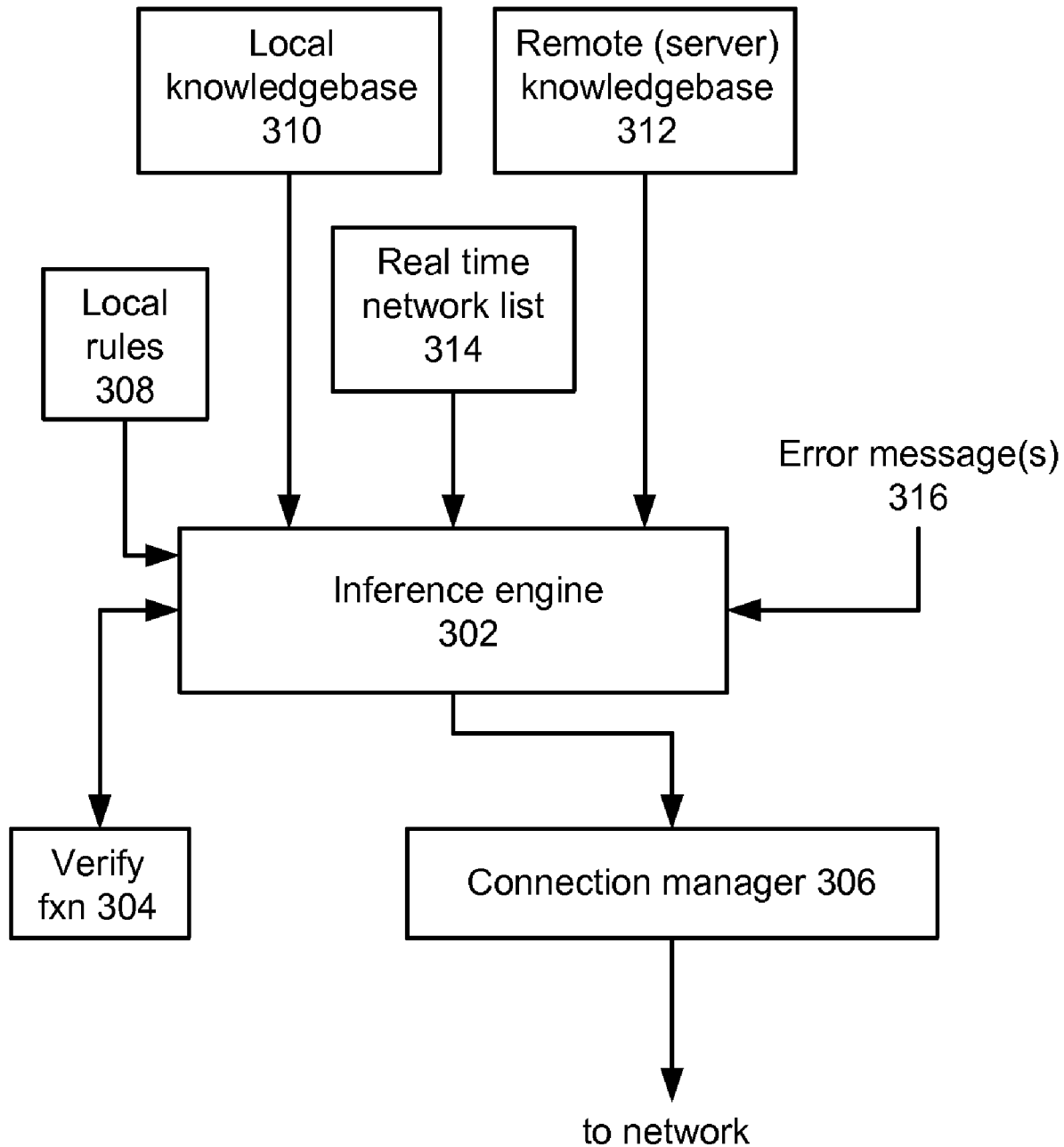
FIG. 3 illustrates a logical software block diagram of the preferred embodiment of the present invention.

FIG. 3 illustrates a logical software block diagram of the preferred embodiment of the present invention 300. As is shown, the preferred embodiment of the present invention includes an inference engine 302, a verify function 304 and a connection manager 306. The inference engine 302 provides functionality for automatically determining the cause of a failed connection and for generating a hierarchy of solutions to repair the connection to the network 220.

In a preferred embodiment, the inference engine 302 analyzes one or more error messages 316 generated by the client 200 relating to the failed connection to assist it in determining the cause of the connectivity failure. In addition, the inference engine 302 invokes the verify function 304, which audits each of the communication devices to determine which, if any, can be potential candidates for connectivity. Based on the information received from the verify function 304 and on its analysis of the error messages 316, the inference engine 102 determines the cause of the connectivity failure.

The inference engine 302 utilizes connectivity information stored in the client computer system 200 to repair the connection based on its diagnosis of the cause for failure. The connectivity information includes a set of local rules or preferences 308, a local persistent knowledgebase 310 a real time network list 314 and optionally, a remote/server-resident knowledgebase. The local rules 308 indicate the client's 200 connection preferences. For example, if the client 200 is capable of establishing a wired and wireless connection, but prefers a wireless connection, the inference engine 302 will attempt to establish a wireless connection before other modes of connectivity. The local persistent knowledgebase 310 includes static configuration information, e.g., parameters and settings. The local persistent knowledgebase 310 can be downloaded and/or updated from the remote/server-resident knowledgebase 312 stored on the company server 112 (FIG. 1).

According to a preferred embodiment of the present invention, the real time network list 314 is a weighted list that includes connectivity information gathered by the network adapter 219 (FIG. 2). As stated above, the network adapter 219 monitors all network traffic, not just the traffic directed toward the client 200, and collects certain connectivity information in real time. Such information includes addresses of DHCP servers 114, DNS servers 160 and gateways, addresses and names of SOCKS servers, names and addresses of printers, IP addresses recently assigned by the DHCP server 114, and other connectivity information. The list 314 is weighted such that the most popular, i.e. most utilized, addresses appear highest on the list 314.

With the connectivity information, the inference engine 302 formulates a best solution, which is then passed to the connection manager 306 and implemented, i.e., a network connection is attempted using the solution. If the solution fails, such information is transmitted back to the inference engine 302, e.g., via an error message 316, so that a new diagnosis of the connection failure can be generated if necessary. This process repeats until a connection is established.

Figure 4:
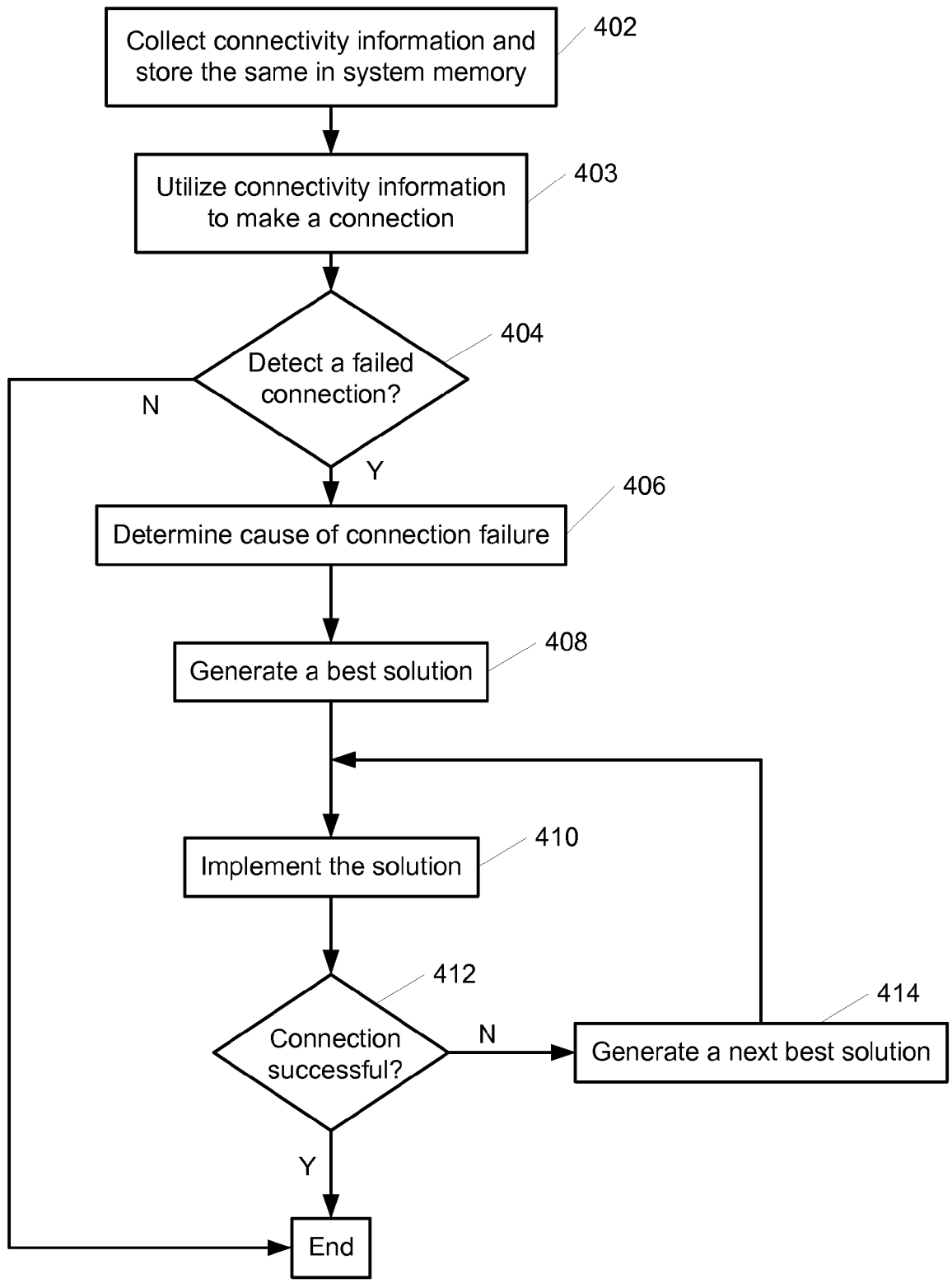
FIG. 4 is a flowchart illustrating a process for establishing a network connection according to a preferred embodiment of the present invention.

FIG. 4 is a flowchart illustrating a process for establishing a network connection according to a preferred embodiment of the present invention. Referring to FIGS. 1-4 together, the process begins at step 402, where connectivity information is collected and stored in memory 214 (FIG. 2). This step may include downloading or updating the static configuration information from the remote/server-resident knowledgebase 312 in the company server 112 for the local persistent knowledgebase 310, and monitoring and collecting connectivity information from the network 220 via the network adapter 219 for the real time network list 314. In step 403, the connectivity information is utilized to make a connection. In step 404, it is determined if a connection failure is detected by the client 200.

If a connection error is determined then an error message is transmitted and in step 406, the root cause of the connection failure is determined. In a preferred embodiment, the inference engine 302 is called automatically once a connection failure is detected. In another embodiment, the user can invoke the inference engine 302. In any event, once the inference engine 302 is called, the inference engine 302 invokes the verify function 304. The verify function 304 audits each communication device to determine its status, e.g., functional or failed, thereby determining which of them are potential candidates for connectivity. The results of the audit are returned to the inference engine 302, which then analyzes the results and the error message(s) 316 in order to determine the root cause of the connection failure.

Once the root cause has been determined, the inference engine 102 generates a best solution (in step 408) using the connectivity information based on the root cause. For example, in one case, the inference engine 302 monitors the range of IP addresses that are assigned by a DHCP server 114. It then selects an address in the range and instructs the connection manager 306 to "ping" that address to determine if it is in use. If the address is not in use, the inference engine 302 temporarily assigns the IP address to the client 200 and sets up its network settings for that connection. In another example, if the inference engine 302 determines that the root cause of a connection failure is due to a missing field, e.g., an IP address for the DHCP server 114 or DNS server 160, from the current discovered configuration, the inference engine 302 will insert the appropriate IP address from the real time network list 314, effectively "filling in the blanks." Because the real time network list 314 is a weighted list, the inference engine 302 applies the most frequently utilized IP addresses, which are also those most likely to succeed.

In step 410, the connection manager 306 implements the best solution. If the connection is unsuccessful (step 412), i.e., the best solution fails, then that result is passed back to the inference engine 302 which reexamines its diagnosis based, in part, on the previous unsuccessful attempt and generates a next best solution (step 414). The process ends when the connection is successful or when all potential solutions have been exhausted.

In summary, the preferred embodiment of the present invention automatically determines the root cause of a connection failure and attempts to repair the connection without intervention from a user. To do this, the inference engine 302 is invoked to analyze one or more error messages 316 related to the connection failure to determine the root cause of the failure. Once the cause is determined, the inference engine 302 utilizes connectivity information stored in the client 200 to repair the connection. The connectivity information includes real time network information, e.g., IP addresses of the DHCP servers and domain name servers, collected by the client's network adapter 219. The real time network information is stored in a weighted list 314, with the most frequently assigned addresses at the top. By utilizing the preferred embodiment of the present invention, the client 200 seamlessly and transparently repairs a failed network connection.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for establishing a network connection between a client system and a network comprising:
    (a) collecting real time connectivity information by the client system, including monitoring and collecting network traffic in real time, the network traffic comprising traffic directed toward the client system and other network traffic, the real time connectivity information including addresses of DHCP servers, addresses of DNS servers, addresses of gateways, addresses and names of SOCKS servers, names and addresses of printers, and IP addresses recently assigned by a DHCP server; and
    (b) utilizing only the collected real time connectivity information by the client system to establish a connection with the network.

2. The method of claim 1 further comprising:
    (c) utilizing data from a local persistent knowledgebase to establish a connection to the network.

3. The method of claim 1 further comprising:
    (c) utilizing data from a server based database to establish a connection to the network.

4. The method of claim 1, wherein the collecting step (a) further includes:
    (a2) assigning a weight to the real time network traffic based on popularity; and
    (a3) creating a weighted list from the weighted real time network traffic.

5. The method of claim 4 further comprising:
    (c) storing the weighted list in the client system.

6. The method of claim 5, wherein the local persistent knowledgebase is stored in the client system.

7. The method of claim 1 further comprising:
    (c) utilizing a set of local rules to establish a connection to the network.

8. The method of claim 1, wherein the utilizing step (b) includes:
    (b1) detecting a failed connection;
    (b2) determining a cause of the failed connection by the client system;
    (b3) generating a solution based on the cause and the real time connectivity information; and
    (b4) implementing the solution.

9. The method of claim 8, wherein the determining step (b2) includes:
    (b2i) analyzing at least one error message associated with the failed connection; and
    (b2ii) auditing a plurality of communication devices in the client to determine which of the plurality of communication devices is a potential candidate for connectivity.

10. The method of claim 8, wherein the generating step (b3) includes:
    (b3i) analyzing the real time connectivity information to determine a range of IP addresses assigned by a DHCP server;
    (b3ii) generating a plurality of IP addresses within the range;
    (b3iii) selecting one of the plurality of IP addresses and determining whether it is in use; and
    (b3iv) assigning the one IP address to the client system if the one IP address is not in use.

11. The method of claim 8 wherein the utilizing step (b) includes:
    (b5) repeating step (b3) for a next solution if the implementation of a previous solution is unsuccessful.

12. A computer readable medium containing program instructions for establishing a connection between a client system and a network, the program instructions for:
    (a) collecting real time connectivity information by the client system, including monitoring and collecting network traffic in real time, the network traffic comprising traffic directed toward the client system and other network traffic, the real time connectivity information including addresses of DHCP servers, addresses of DNS servers, addresses of gateways, addresses and names of SOCKS servers, names and addresses of printers, and IP addresses recently assigned by a DHCP server; and
    (b) utilizing only the collected real time connectivity information by the client system to establish a connection with the network.

13. The computer readable medium of claim 12 further comprising:
    (c) utilizing data from a local persistent knowledgebase to establish a connection to the network.

14. The computer readable medium of claim 12 further comprising:
    (d) utilizing data from a server based database to establish a connection to the network.

15. The computer readable medium of claim 12, wherein the collecting instruction (a) further includes:
    (a2) assigning a weight to the real time network traffic based on popularity; and
    (a3) creating a weighted list from the weighted real time network traffic.

16. The computer readable medium of claim 15 further comprising the instruction for:
    (c) storing the weighted list in the client system.

17. The computer readable medium of claim 16, wherein the local persistent knowledgebase is stored in the client system.

18. The computer readable medium of claim 12 further comprising:
    (c) utilizing a set of local rules to establish a connection to the network.

19. The computer readable medium of claim 12, wherein the utilizing instruction (b) includes:
    (b1) detecting a failed connection;
    (b2) determining a cause of the failed connection by the client system;

(b3) generating a solution based on the cause and the real time connectivity information; and (b4) implementing the solution.

20. The computer readable medium of claim 19, wherein the determining instruction (b2) includes:

(b2i) analyzing at least one error message associated with the failed connection; and (b2ii) auditing a plurality of communication devices in the client to determine which of the plurality of communication devices is a potential candidate for connectivity.

21. The computer readable medium of claim 19, wherein the generating instruction (b3) includes:

(b3i) analyzing the real time connectivity information to determine a range of IP addresses assigned by a DHCP server;

(b3ii) generating a plurality of IP addresses within the range;

(b3iii) selecting one of the plurality of IP addresses and determining whether it is in use; and (b3iv) assigning the one IP address to the client system if the one IP address is not in use.

22. The computer readable medium of claim 19 wherein the utilizing instruction (b) includes:

(b5) repeating step (b3) for a next solution if the implementation of a previous solution is unsuccessful.

23. A computer system coupled to a network comprising:

at least one network adapter for monitoring and collecting real time connectivity information from the network, including monitoring and collecting network traffic in real time, the network traffic comprising traffic directed toward the computer system and other network traffic, the real time connectivity information including addresses of DHCP servers, addresses of DNS servers, addresses of gateways, addresses and names of SOCKS servers, names and addresses of printers, and IP addresses recently assigned by a DHCP server;

memory for storing the real time connectivity information; and a processor coupled to the memory and to the at least one network adapter, wherein the processor is configured to execute program instructions for utilizing only the collected real time connectivity information to repair a failed network connection between the computer system and the network.

24. The computer system of claim 23, wherein the program instructions further comprises assigning a weight to the real time connectivity information based on popularity and creating a weighted list from the weighted real time connectivity information.

25. The computer system of claim 23, wherein the processor is configured to invoke an inference engine for determining a cause of a failed connection between the computer system and the network and for generating a solution based on the cause utilizing the real time connectivity information.

* * * * *